(12) United States Patent
Engel et al.

(10) Patent No.: US 7,945,715 B2
(45) Date of Patent: May 17, 2011

(54) SYSTEM FOR DATA TRANSFER BETWEEN MICROCOMPUTER DEVICES

(75) Inventors: Andreas Engel, Schieder-Schwalenberg (DE); Rainer Esch, Blomberg (DE)

(73) Assignee: Phoenix Contact GmbH & Co., KG, Blomberg (DE)

( * ) Notice: Subject to any disclaimer, the term of this patent is extended or adjusted under 35 U.S.C. 154(b) by 740 days.

(21) Appl. No.: 10/410,488

(22) Filed: Apr. 9, 2003

(65) Prior Publication Data
US 2003/0200376 A1 Oct. 23, 2003

(51) Int. Cl.
*G06F 3/00* (2006.01)
(52) U.S. Cl. .......... 710/40; 710/2; 710/3; 710/4; 710/5; 710/6; 710/7; 710/29; 710/33; 710/36; 710/52; 710/58; 710/60
(58) Field of Classification Search .......... 710/2, 3, 710/4, 5, 6, 7, 29, 33, 36, 40, 52, 58, 60
See application file for complete search history.

(56) References Cited

U.S. PATENT DOCUMENTS

| | | | | |
|---|---|---|---|---|
| 4,355,354 A * | 10/1982 | Kempf et al. | .............. | 709/237 |
| 4,358,823 A * | 11/1982 | McDonald et al. | .............. | 714/11 |
| 4,590,556 A * | 5/1986 | Berger et al. | .............. | 713/1 |
| 4,967,377 A * | 10/1990 | Masuda | .............. | 713/1 |
| 5,070,450 A * | 12/1991 | Holman et al. | .............. | 713/1 |
| 5,253,159 A * | 10/1993 | Bilas et al. | .............. | 700/22 |
| 5,598,537 A * | 1/1997 | Swanstrom et al. | .............. | 710/304 |
| 5,784,645 A * | 7/1998 | Saegusa et al. | .............. | 710/33 |
| 6,728,320 B1 * | 4/2004 | Khasnis et al. | .............. | 375/257 |
| 6,742,072 B1 * | 5/2004 | Prakash et al. | .............. | 710/305 |
| 6,851,183 B2 * | 2/2005 | Quinlan et al. | .............. | 29/832 |
| 2001/0039569 A1 * | 11/2001 | Bretscher | .............. | 709/205 |
| 2002/0184447 A1 | 12/2002 | Moeller | | |
| 2003/0040897 A1 * | 2/2003 | Murphy et al. | .............. | 703/18 |

FOREIGN PATENT DOCUMENTS

| | | |
|---|---|---|
| DE | 199 61 138 C 2 | 11/2001 |
| DE | 100 26 416 A 1 | 1/2002 |

OTHER PUBLICATIONS

IDT High-speed 3.3V 1K×8 Dual-Port Static Ram, Sep. 1999, Integrated Device Technology, Inc.
PCI 9050, PLX Technology, Inc., Aug. 1996.
Interbus User Manual—IBS PCI DDK UM E, Phoenix Contact, Jul. 2001.
Ethernet for Automation, Phoenix Contact GmbH & Co., 2000.

* cited by examiner

*Primary Examiner* — Tariq Hafiz
*Assistant Examiner* — Jasjit S Vidwan
(74) *Attorney, Agent, or Firm* — Charles E. Baxley

(57) ABSTRACT

The system according to the present invention for data transfer between microcomputer devices contains a standard protocol controller, a generally known ethernet controller, for example, as a coupling device instead of the known multipart RAM. Instead of a parallel data connection, the microcomputer devices are coupled to one another via a standardized, serial data connection, for example, ethernet. Using functions of ethernet switches already known, a number of microcomputer devices in the system may be increased.

37 Claims, 3 Drawing Sheets

SYSTEM FOR DATA TRANSFER BETWEEN MICROCOMPUTER DEVICES

BACKGROUND OF THE INVENTION

1. Field of the Invention

The present invention relates to a system for data transfer. More particularly, the present invention relates to a system for data transfer between microcomputer devices.

2. Description of the Prior Art

Systems for data transfer in which accessing units are decoupled via a multiport RAM memory device are known in the art. In this case, the multiport RAM memory device is used as a coupling device for data between the accessing units.

A multiport RAM memory device having two ports is described in "IDT High-Speed 3.3 V 1Kx8 Dual-Port Static RAM, September 1999". All data, addresses, and control signals are connected in parallel to a memory device. A high number of signals resulting therefrom is disadvantageous if the accessing units are electrically isolated from one another or if even more accessing units are to be added. Control of the memory device requires a certain outlay, since accessing conflicts must be dealt with by the memory device and by the accessing units.

A protocol controller for data transfer between a first microcomputer device containing a first microprocessor bus, referred to here as a local bus, and a standardized data bus, referred to here as a PCI bus, is described in "PCI 9050, PLX Technology, Inc. 1996". In this case, the PCI bus is used as a signal connection between two microcomputer devices which are transferring data to one another. Functional separations may only be achieved if all signals to the PCI bus are switched off, i.e., a high resistance state (tri-state) is switched to. Electrical isolation between the two microcomputer devices of this type is impossible, or is only possible at a very high cost, since the number of parallel signals is very high. As a supplement to this, a microcomputer device, referred to here as an interbus interface module for PCI, which is suitable for data transfer via the standardized PCI bus, is described in "IBS PCI DDK UM, Phoenix Contact, 7/2001"

A further multiport memory device is taught by German Patent 199 61 138 C2. In this case, access by multiple accessing units to a single-port RAM is made possible using a time-multiplex system. To provide control signals and address signals, serial-parallel converters are used, and time slot assignment units are used to assign and schedule time control. In this case, the time slot assignment units are implemented as control units which require a very high outlay for implementation and/or programming. Separate implementation and/or programming is necessary for each number of accessing units. The serial-parallel converters convert serially arriving signals in such a way that they are applied in parallel to corresponding ports of a multipart RAM. In order to be able to operate multiple ports, all data signals, control signals, and address signals are necessary for each port, due to which a very high number of signals result at the multiport RAM.

A system for data transfer which decouples a serial connection between two microcomputer devices in such a way that the data to be transmitted or received is buffered, therefore making the microcomputer devices independent of the cycle of the data to be transmitted or received, is taught by German Patent Application 100 26 4 16 A1.

Functions of known components for data transfer via ethernet are described in "Ethernet in der Automatisierungstechnik [Ethernet in Automation Engineering], 2000 by Phoenix Contact GmbH & Co". Basic functions of hubs and switches are described. These components allow division of systems for data transfer into segments. Multiple microcomputer devices which transfer data to one another may be located within the segments. Mechanisms according to known ethernet standard for addressing the microcomputer devices are schematically described.

BRIEF SUMMARY OF THE INVENTION

The present invention is a system for data transfer between microcomputer devices. The microcomputer devices may be turned off separately from one another. Respective microcomputer devices still remaining turned on are not influenced in their operation and their power supply. In order to provide electrical isolation between the microcomputer devices necessary for this purpose, a number of signals to be coupled is to be kept as low as possible. Use of standard components for data transfer is preferable in this case in order to achieve a lowest possible implementation outlay. Increasing a number of microcomputer devices which transfer data to one another is possible.

The system according to the present invention is also suitable for data transfer between at least one microcomputer device and at least one additional device, such as, a plug-in card or memory or an interface module for a field bus system.

In the system according to the present invention for data transfer between microcomputer devices, each microcomputer device contains a standard protocol controller, an ethernet controller known from the related art, for example, as a coupling device for the data, instead of the known multipart RAM. The protocol controller of this type contains terminals for a microprocessor bus having multiple signals for a microprocessor or, for example, a parallel standard PCI bus and one or more terminals for serial data signals for data transfer, ethernet, for example. Addressing and access control of one microcomputer device from another microcomputer device is performed using standard functions already implemented in the protocol controller, an ethernet controller, for example. Access conflicts, addressings, and other functions necessary for data access are executed in the protocol controller. Spatial arrangement of the microcomputer devices which transfer data to one another is not fixed for the system according to the present invention, so that at least two microcomputer devices may be arranged within one system. It is also conceivable for both microcomputer devices which transfer data to one another to be positioned on one single board and/or circuit board. The microcomputer devices to be coupled to one another may each have their own power supply, so that only serial data signals receive electrical isolation via an optical coupler or other devices. In a case of an ethernet connection, for example, this requires electrical isolation of only four signal lines. Interfacing of further microcomputer devices to an already existing system of microcomputer devices is easily possible using known hubs or switches. In this case, overall access control does not require any change of an existing system of microcomputer devices. Even spatially distant microcomputer devices may be additionally introduced easily and in a known way into an existing system for data transfer between microcomputer devices using an additional line connection.

LIST OF REFERENCE NUMERALS UTILIZED IN THE DRAWING

1: first microcomputer device
2: first microprocessor
3: first microprocessor bus 4: first coupling device, first protocol controller
5: serial data signals in first microcomputer device 1
6: power supply region of first microcomputer device 1
7: electrical isolation
8: second microcomputer device
9: second microprocessor
10: second microprocessor bus
11: second coupling device, second protocol controller
12: serial data signals in second microcomputer device 8
13: power supply region of second microcomputer device 8
14: higher-order microcomputer device
15: ethernet switch
16: first serial data connection
17: second serial data connection
18: third microcomputer device
19: cable
20: first microcomputer device connected in parallel
21: second microcomputer device connected in parallel
22: multipart RAM
23: first port
24: second port

DETAILED DESCRIPTION OF THE INVENTION

Figure 1:
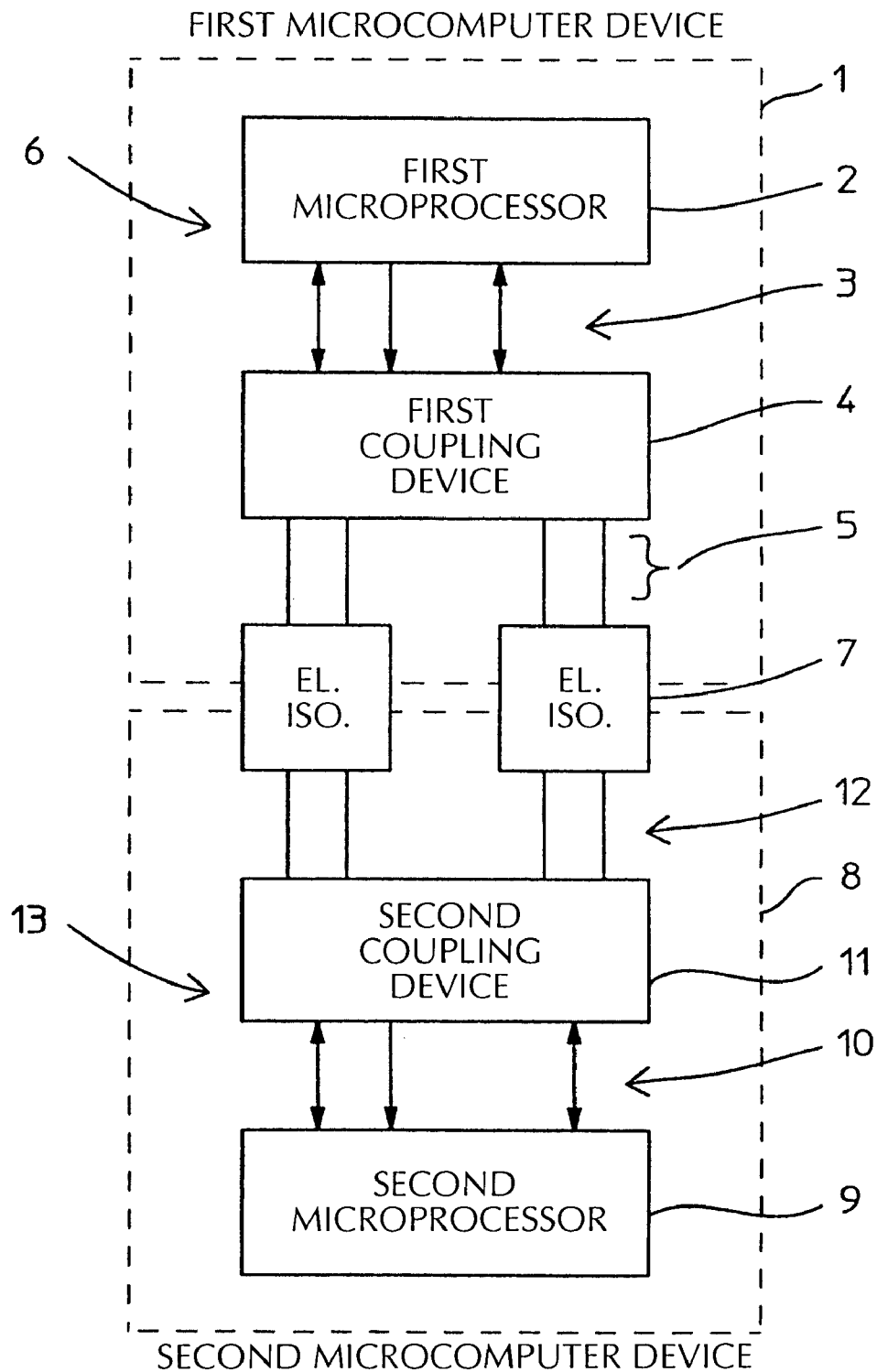
FIG. 1: shows a system for data transfer between two microcomputer devices.

FIG. 1 shows functional units for a system for data transfer between two microcomputer devices. Only components necessary for illustrating the system according to the present invention are shown, function of respective microcomputer devices is not relevant for description.

In the example described, the two microcomputer devices are positioned on a board shared by both of the microcomputer devices. A first microcomputer device 1 contains, in addition to components for its task which are not described in more detail, at least necessary components for data transfer to at least a second microcomputer device 8. For data transfer from the first microcomputer device 1 to the second microcomputer device 8, a first protocol controller 4 is connected via a first microprocessor bus 3 to a first microprocessor 2 contained in the first microcomputer device 1. The first microprocessor bus 3 is implemented as parallel in this case, typically containing address signals, control signals, and data signals. In the example described, the first protocol controller 4 is a standard ethernet controller, as has already been described in the related art. The first protocol controller 4 is capable of serially outputting the data to be transferred according to a known ethernet standard via serial data signals 5.

The second microcomputer device 8 also contains a second protocol controller 11 for serial data reception, which provides received serial data signals 12 as data for parallel access of a second access of a second microprocessor 9 via a second microprocessor bus 10. Implementation of the second microprocessor bus 10 may differ from that of the first microprocessor bus 3 in this case. In the present example, signal connection of the serial data signals 5 of the first microcomputer device 1 to the serial data signals 12 of the second microcomputer device 8 is performed via an electrical isolation 7, which may be produced, for example, using generally known optical couplers, magnetic couplers, or capacitive couplers. In case of electrical isolation of the serial data signals 5, 12, a power supply region 6 of the first microcomputer device 1 may be constructed separately from a power supply region 13 of the second microcomputer device 8. Data transfer from the second microcomputer device 8 to the first microcomputer device 1 is performed in a same way in this case, but in a reverse direction. In the reverse direction means that the data transfer from the second microcomputer device 8 to the first microcomputer device 1 is performed so that the second microprocessor 9 transfers the data to be transferred to the second protocol controller 11 via its second microprocessor bus 10, the second protocol controller 11 being capable of serially transferring the data to be transferred to the first microcomputer device 1 via the serial data signals 12, 5 according to the known ethernet standard, with or without the electrical isolation 7.

Figure 2:
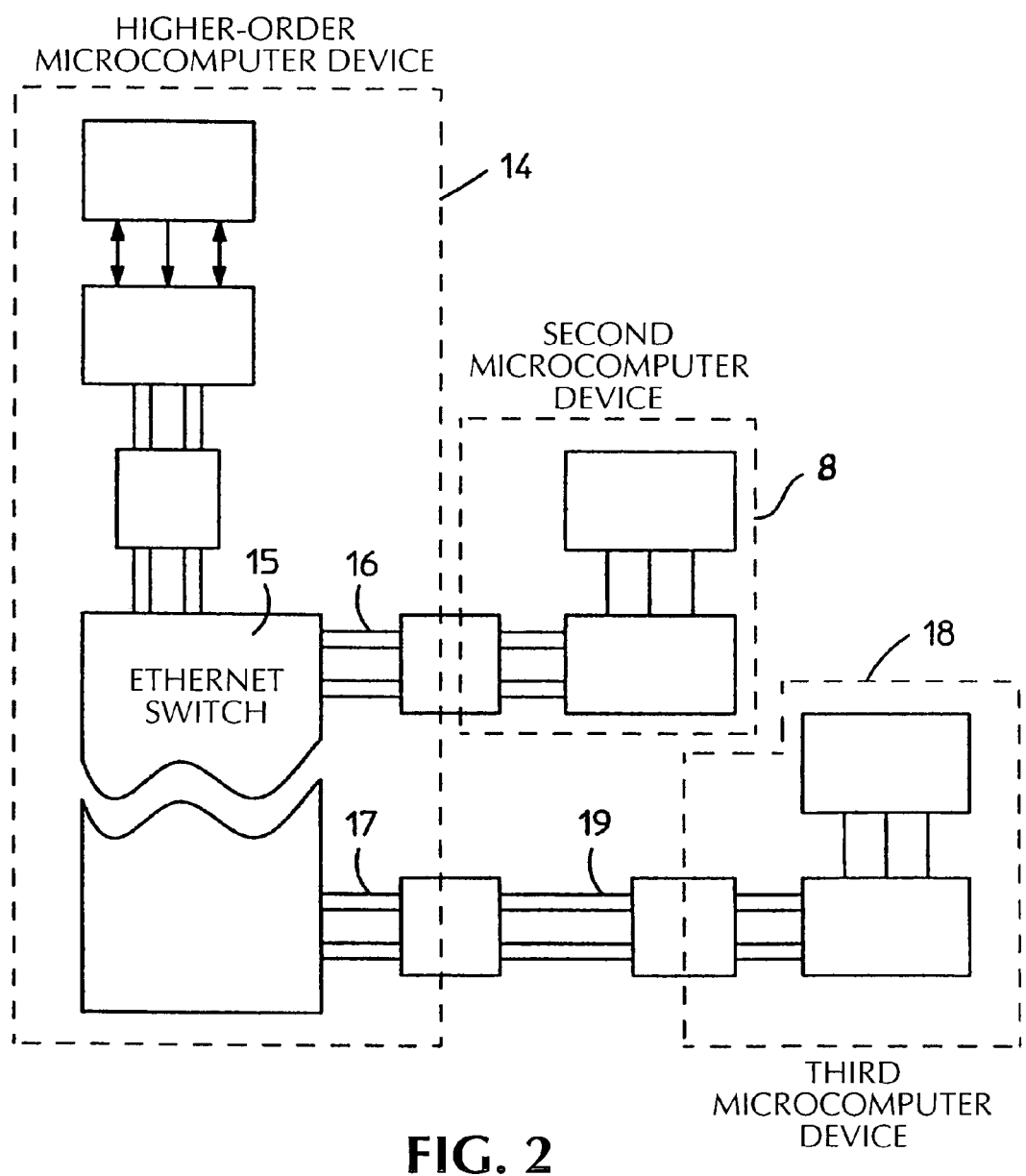
FIG. 2: shows a system for data transfer having more than two microcomputer devices.

FIG. 2 shows an overview of a system for data transfer between more than two microcomputer devices. A higher-order microcomputer device 14 contains, in addition to components relevant for its function and components described above for data transfer, an ethernet switch 15, which has been described in the related art and is therefore generally known. The ethernet switch 15 is only used for providing more than one serial data connection, so that the second microcomputer device 8 is connected at a first serial data connection 16, and a third microcomputer device 18 is connected at a second serial data connection 17.

Of course, in the system according to the present invention for data transfer, one or more microcomputer devices may also be connected to one another with the aid of a cable 19, for example, a standard ethernet cable. Even a combination of microcomputer devices spatially connected to one another and microcomputer devices spatially separated from one another is possible.

Figure 3:
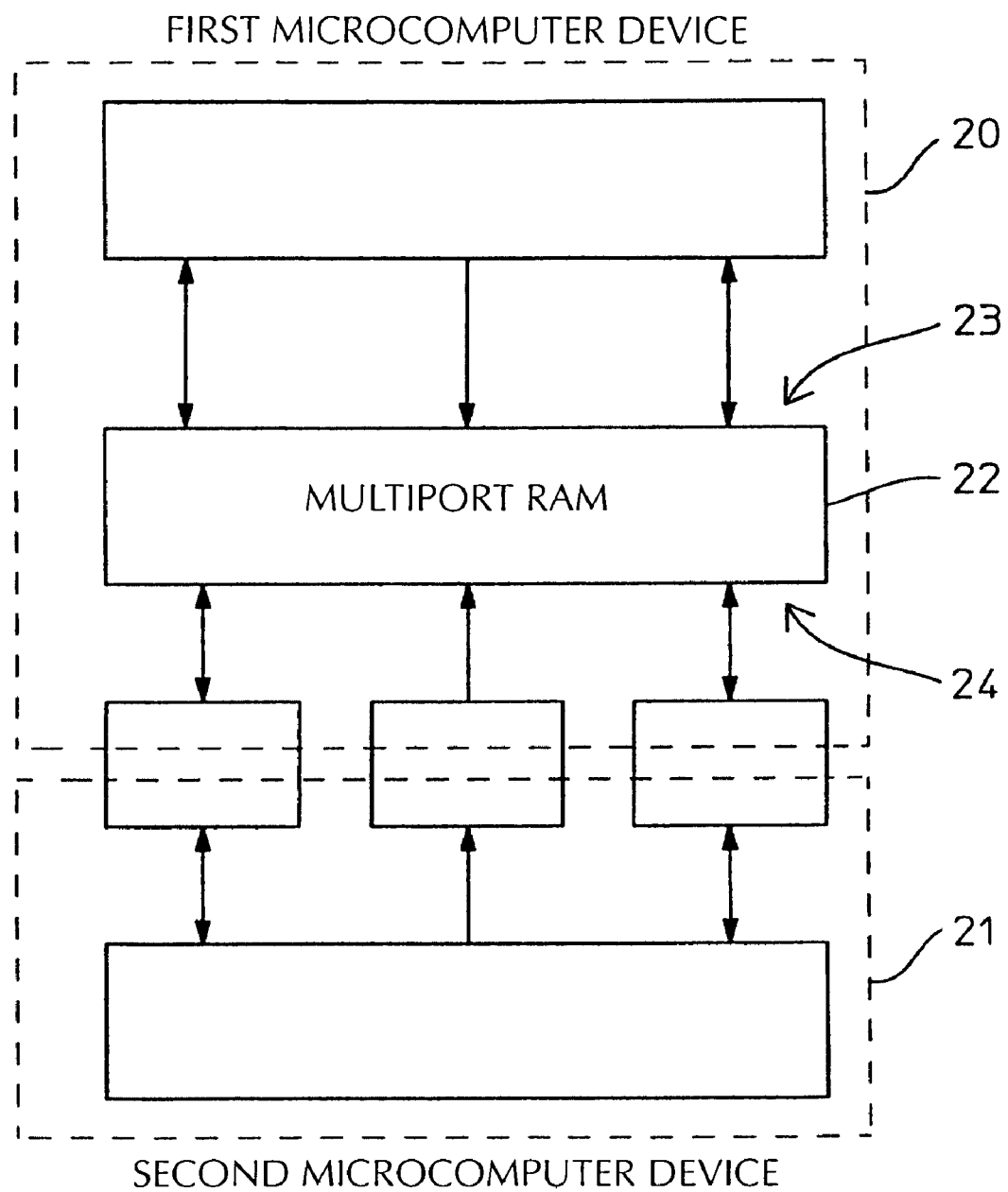
FIG. 3: shows a system for data transfer between two microcomputer devices according to the related art.

FIG. 3 shows an example of a system for parallel data transfer between first and second microcomputer devices 20, 21 in a parallel method. The first microcomputer device 20 connected in parallel contains a multipart RAM 22 for data connection, which for a data transfer to the second microcomputer device 21 connected in parallel uses data and addressing information to be transferred via a first port 23. The second microcomputer device 21 connected in parallel may read this data, which is intended for it, via a second port 24 of the multipart RAM 22. It is obvious that the data transfer is also possible in the other direction, i.e., from the second microcomputer device 21 connected in parallel to the first microcomputer device 20 connected in parallel.

The invention claimed is:
1. A system for data transfer between microcomputer devices (1, 8), wherein each of the microcomputer devices (1, 8) contains at least one microprocessor (2, 9), a microprocessor bus (3, 10), and a coupling device (4, 11) connected thereto, wherein the coupling device (4, 11) provides a serial protocol, and wherein data transfer is performed between the microcomputer devices (1, 8) via the coupling devices (4, 11), said system comprising:
 a) the microcomputer devices (1, 8) being spatially positioned within one system;
 b) each microcomputer device (1, 8) being assigned its own, separate power supply (6, 13);
 c) the coupling devices (4, 11) providing a standardized serial protocol;
 d) the power supply regions (6, 13) of the microcomputer devices (1, 8) are switchable off and on individually and a respective power supply region (6, 13) of a microcom- puter device (1, 8) which remains switched on remains uninfluenced by another microcomputer device (1, 8);

wherein a standardized serial ethernet protocol is used for the serial data transfer between the microcomputer devices (1, 8);

wherein the microcomputer devices (1, 8) are spatially positioned on one board; and wherein a serial data connection (5, 12) between the microcomputer devices (1, 8) contains an electrical isolation (7).

2. The system according to claim 1, wherein in addition to the two microcomputer devices (14, 8) which transfer data to one another, at least one further microcomputer device (18) is incorporable into the system.

3. The system according to claim 2, wherein an ethernet switch (15) is used in at least one microcomputer device (14) for coupling in further microcomputer devices (1, 18).

4. The system according to claim 2, wherein at least one microcomputer device (18), which is spatially distant, is connected via a cable (19) to a higher-order microcomputer device (14).

5. The system according to claim 2, wherein a serial connection (5, 12) between the microcomputer devices (1, 8) contains an electrical isolation (7).

6. The system according to claim 5, wherein the electrical isolation (7) is produced using an optical coupler.

7. The system according to claim 5, wherein the electrical isolation (7) is produced using a magnetic coupler.

8. The system according to claim 5, wherein the electrical isolation (7) is produced using a capacitive coupler.

9. The system according to claim 1, wherein an ethernet switch (15) is used in at least one microcomputer device (14) for coupling in multiple further microcomputer devices (1, 18).

10. The system according to claim 9, wherein at least one microcomputer device (18), which is spatially distant, is connected via a cable (19) to a higher-order microcomputer device (14).

11. The system according to claim 9, wherein a serial connection (5, 12) between the microcomputer devices (1, 8) contains an electrical isolation (7).

12. The system according to claim 11, wherein the electrical isolation (7) is produced using an optical coupler.

13. The system according to claim 11, wherein the electrical isolation (7) is produced using a magnetic coupler.

14. The system according to claim 11, wherein the electrical isolation (7) is produced using a capacitive coupler.

15. The system according to claim 1, wherein at least one microcomputer device (18), which is spatially distant, is connected via a cable (19) to a higher-order microcomputer devices (14).

16. The system according to claim 15, wherein a serial connection (5, 12) between the microcomputer devices (1, 8) contains an electrical isolation (7).

17. The system according to claim 16, wherein the electrical isolation (7) is produced using an optical coupler.

18. The system according to claim 16, wherein the electrical isolation (7) is produced using a magnetic coupler.

19. The system according to claim 16, wherein the electrical isolation (7) is produced using a capacitive coupler.

20. The system according to claim 1, wherein the electrical isolation (7) is produced using an optical coupler.

21. The system according to claim 1, wherein the electrical isolation (7) is produced using a magnetic coupler.

22. The system according to claim 1, wherein the electrical isolation (7) is produced using a capacitive coupler.

23. The system according to claim 1, wherein the microcomputer devices (1, 8) are spatially positioned on one board.

24. The system according to claim 1, wherein in addition to the two microcomputer devices (14, 8) which transfer data to one another, at least one further microcomputer device (18) is incorporable into the system.

25. The system according to claim 1, wherein an ethernet switch (15) is used in at least one microcomputer device (14) for coupling in multiple further microcomputer devices (1, 8).

26. The system according to claim 1, wherein at least one microcomputer device (18), which is spatially distant, is connected via a cable (19) to a higher-order microcomputer device (14).

27. The system according to claim 1, wherein a serial connection (5, 12) between the microcomputer devices (1, 8) contains an electrical isolation (7).

28. The system according to claim 27, wherein the electrical isolation (7) is produced using an optical coupler.

29. The system according to claim 27, wherein the electrical isolation (7) is produced using a magnetic coupler.

30. The system according to claim 27, wherein the electrical isolation (7) is produced using a capacitive coupler.

31. The system according to claim 1, wherein in addition to the two microcomputer devices (14, 8) which transfer data to one another, at least one further microcomputer device (18) is incorporable into the system.

32. The system according to claim 1, wherein an ethernet switch (15) is used in at least one microcomputer device (14) for coupling in multiple further microcomputer devices (1, 18).

33. The system according to claim 1, wherein at least one microcomputer device (18), which is spatially distant, is connected via a cable (19) to a higher-order microcomputer device (14).

34. The system according to claim 1, wherein a serial connection (5, 12) between the microcomputer devices (1, 8) contains an electrical isolation (7).

35. The system according to claim 34, wherein the electrical isolation (7) is produced using an optical coupler.

36. The system according to claim 34, wherein the electrical isolation (7) is produced using a magnetic coupler.

37. The system according to claim 34, wherein the electrical isolation (7) is produced using a capacitive coupler.

* * * * *